Patented Apr. 15, 1930

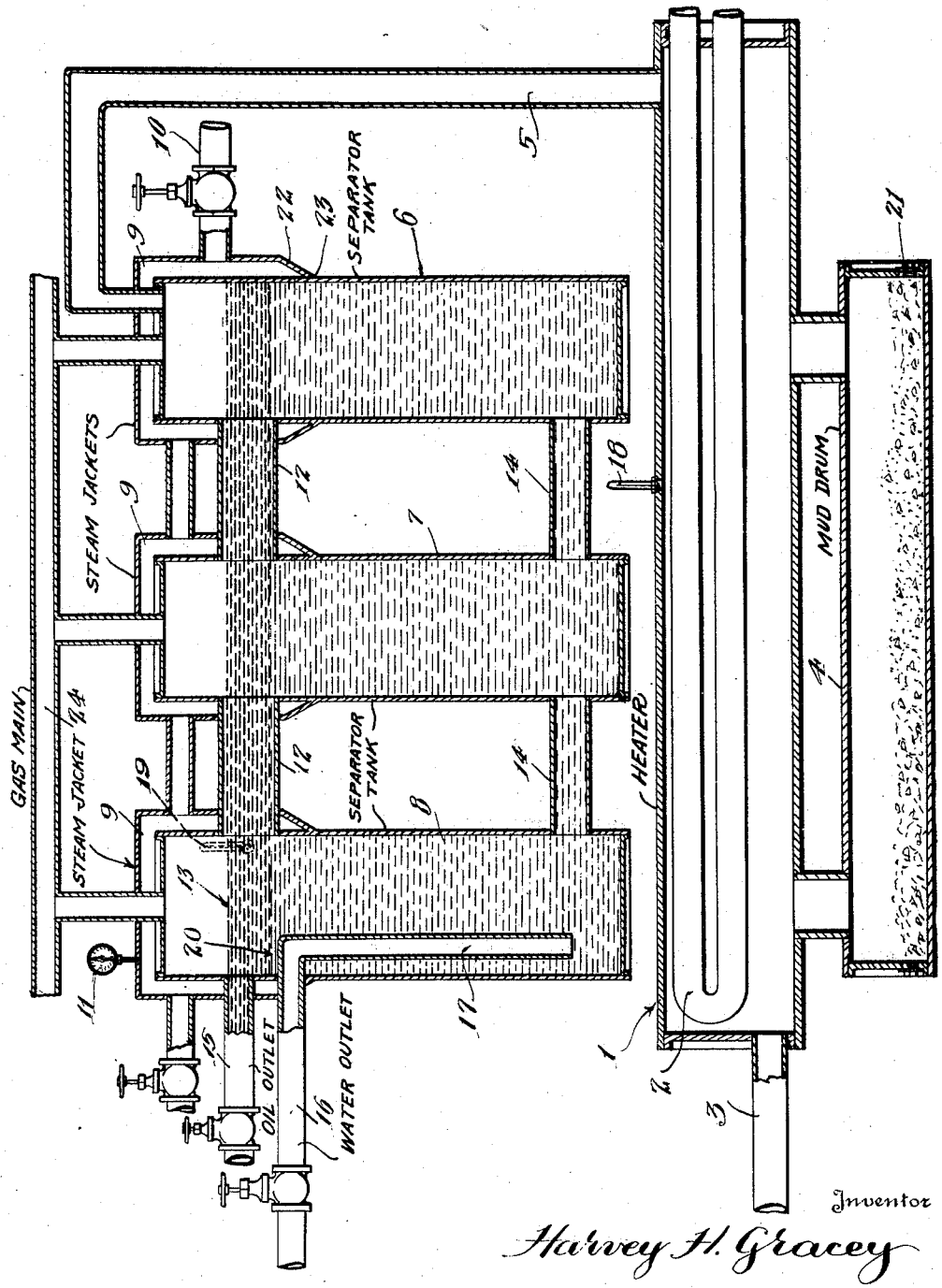

1,754,789

UNITED STATES PATENT OFFICE

HARVEY H. GRACEY, OF FORT WORTH, TEXAS

OIL SEPARATOR

Application filed October 6, 1925, Serial No. 60,856. Renewed January 11, 1930.

This invention relates to an oil, gas and water separator such as used in connection with oil wells for separating the oil, water and gas from each other. In such apparatus the mixture is subjected to a high temperature to effect the separation of the oil and water, so that the water collects at a low level, and the oil at a high level. The oil and water are then drawn off respectively at different levels.

The general object of this invention is to provide simple means for effecting the heating of the mixture at or about the oil level without heating a relatively large body of water which is contained in the entire mixture being separated.

One of the objects of the invention is to provide a construction having these features, and which is of a unitary type, thereby enabling the capacity of the apparatus to be increased to adapt it to any particular requirements, simply by adding additional units.

Further objects of the invention will appear hereinafter.

The invention consists in the novel parts and combinations of parts to be described hereinafter, all of which contribute to produce an efficient oil separator.

A preferred embodiment of the invention is described in the following specification, while the broad scope of the invention is pointed out in the appended claims.

In the drawing, the figure is a diagram and represents a vertical section taken through the apparatus, certain parts being broken away or shown in elevation.

In practicing the invention I provide one or more separator tanks, or separator units, each unit being connected to cooperate with the heater in which the mixture is heated before it passes into the separator tank. The separator tank is provided with means such as a steam jacket surrounding its upper end, but terminating short of its lower portion so that the heating is confined to the upper end of the tank.

In practice where a large capacity for the apparatus is desired, I provide a battery of these separator tanks or units connected together in series, that is to say, they are connected together so that the interiors communicate at about the oil level, and they are connected together at a low level below the water level. The steam jackets may be connected together in series.

Referring to the drawing, 1 represents the heater which is in the form of a horizontal drum through which passes a steam coil 2 to heat the mixture of oil, gas and water which is delivered to the heater through a pipe 3.

The under side of the heater 1 is connected to a mud drum 4 in which sand, shale and other solid matter may collect.

From the end of the heater 1, remote from the inlet 3, I provide an outlet 5 which delivers the heated mixture to a separator 6. If desired this separator 6 may be connected in series with two other similar separators 7 and 8. Each of these separators is in the form of a vertical drum or cylinder, the upper portion of which is enveloped in a steam jacket 9. These steam jackets may be connected in series, the steam being admitted through an inlet pipe and valve 10. A pressure gage 11 indicates the pressure of the steam within the jackets. The interiors of the containers or separator tanks communicate through pipe connections or trunks 12 which are located at a high level, that is to say, at about but below the level of the oil, that is, the surface of the oil as indicated by the line 13.

The lower ends of the casings or separator tanks communicate with each other in series through similar pipes or trunks 14.

The last tank of the battery has an outlet connection 15 with a valve through which the oil finds outlet.

This tank is also provided with the water outlet 16 with a valve, and this outlet includes a siphon leg 17, the mouth of which is disposed near the bottom of this tank.

The thermometer 18 is provided on the heater 1, and a thermometer 19 is provided for indicating the temperature in the oil which is carried between the oil level 13 and the water level indicated at the line 20.

In the operation of the apparatus the mixture in the heater 1 is heated to approximately 200° Fahrenheit, and in the separator tanks the temperature may be maintained between the limits of 250° Fahrenheit and 300° Fahrenheit.

The sand drum 4 is provided with a clean-out plug 21.

The jackets 9 are preferably formed with conical or tapered lower ends 22 which are welded at 23 to the outer sides of the walls of the separator tanks.

It will be noted that with this apparatus the upper portion only of the mixture is heated to the high temperature. That is to say, this heating means is confined at its lower edge to the upper portion of the containers. In this way I effect an efficient separation of the oil and water with a minimum amount of steam consumption.

Any gas which is formed in the upper ends of the separators may be collected in a main 24 which may lead the gas to a refinery, or if desired, may let the same escape in the atmosphere.

A glass sight-gage (not illustrated) is used on the battery of separator tanks to indicate the oil and water levels.

It is understood that the embodiment of the invention described herein is only one of the many embodiments this invention may take, and I do not wish to be limited in the practice of the invention, nor in the claims, to the particular embodiment set forth.

What I claim is:—

1. In a separator for treating a mixture of oil, water and gas, the combination of a plurality of containers for the mixture, having connections opening communication between the same near the upper ends of the containers operating to permit the mixture at the upper levels and in which the oil predominates, to flow horizontally between the containers, means for connecting the containers at a point near their lower ends operating to open communication between the same and permit the liquid at the lower levels in which the water predominates, to flow horizontally between the containers, and heating means confined to the upper ends of the containers at and above the level of the first mentioned connections for heating the upper ends only of the containers in the vicinity of the said upper levels.

2. In a separator for treating a mixture of oil, water and gas, the combination of a plurality of casings, pipes connecting the casings in series near their upper ends opening communication between the containers and permitting the upper oilier levels of the liquid to flow horizontally between the containers, pipes connecting the casings in series near the lower ends of the casings opening communication between the same and permitting horizontal flow of the lower and less oily portions of the liquid between the containers, and heating means confined to the upper ends of the casings at and above the level of the first-mentioned pipes, operating to heat only the upper ends of the casings and the oilier portions of the mixture located at the upper ends of the same.

3. In a separator treating a mixture of oil, water and gas, the combination of a plurality of casings, pipes connecting the same in series near their upper ends and pipes connecting the casings in series near their lower ends, a steam jacket surrounding the upper end of each casing confined at its lower end to the vicinity of the first named pipes, and extending upwardly from the level of the oil within the casing, one of said casings having an outlet for the water.

4. In a separator treating a mixture of oil, water and gas, the combination of a heater for receiving the mixture, a drum connected with the under side of the heater to collect sand and shale, a separator tank in the form of a vertical cylinder receiving the heated mixture from the heater and having an outlet near the upper end for the oil, and having an outlet near the lower end for the water in the separator tank, and a steam jacket surrounding the upper portion of the tank confined at its lower edge to the vicinity of the first named outlet and operating to heat the vertical cylinder only at its upper end.

5. In an oil, water and gas separator, the combination of a heater to receive and heat the mixture of oil, gas and water, a steam coil passing through the same, a drum connected with the under side of the heater to collect sand and solid matter in the mixture, and a battery of separator tanks for receiving and heating the mixture from the heater, each separator consisting of an upright cylindrical tank with a steam jacket around its upper end, said tanks being connected in series at their upper ends adjacent and below the oil level and connected at the lower ends below the water level, said battery having an outlet for the oil at about the oil level, and an outlet for the water below the water level.

Signed at Los Angeles, California, this 30th day of September, 1925.

HARVEY H. GRACEY.